UNITED STATES PATENT OFFICE.

WILLIAM BRAH, OF MILWAUKEE, WISCONSIN.

METHOD OF PREPARING BLOCKS OF WOOD FOR ENGRAVING.

SPECIFICATION forming part of Letters Patent No. 274,556, dated March 27, 1883.

Application filed May 16, 1882. (Specimens.)

*To all whom it may concern:*

Be it known that I, WILLIAM BRAH, of the city of Milwaukee and State of Wisconsin, have invented a new and useful Process to be Used in Wood-Engraving, which process is fully set forth in the following specification.

This invention relates to wood-engraving, and has for its object to render the woods now in use, and others which have heretofore been deemed useless in wood-engraving, more durable, and woods which have not heretofore been in use, as aforesaid, substitutes for the more expensive woods now in use, when the same are used in engraving upon for the purpose of producing a cut, drawing, or picture to be used in printing or to electrotype from, by subjecting the woods to a coating upon all of their surfaces for the purpose of preventing the action of the atmosphere upon the same and hardening the surface to be engraved upon, rendering the texture of the immediate surface tough, firm, and of great durability, while it leaves the inner portions of the woods of the same consistency as when in their natural state, causing the surface of the relief parts of the cut to become compact, dense, and level, changing the nature of the woods in the lower parts of said relief portions to only a slight degree, not enough, however, to destroy the original elasticity of the woods at said point, or producing a brittleness throughout said relief portions, whereby they are not susceptible of the use for which they are employed, and are easily broken away from the block after the cut is completed, rendering the woods used susceptible of a more delicate handling than when in their crude state, and rendering the blocks impervious to the action of the atmosphere, preventing warping and like faults.

In carrying out my invention the end or side grains of the woods are coated; or the outer pores are first filled with some light coloring substance, a composition of the following ingredients being most practical, viz:

Formula 1: white of one egg, one-half ounce of water, three drams flake-white, and five grains salicylic acid; yet any light coloring substance which will not penetrate to any great distance beyond the surface of the woods can be used. Then this last-mentioned coating, when it has become dry, is again covered or coated with an additional coating of thin shellac, produced transparent by the following process:

Formula 2: one part of shellac dissolved in six parts ninety-proof alchohol, and seven parts of whiting. Shake well and set aside for forty-eight hours, when the liquid is turned or poured off; or the shellac, dissolved as aforesaid, can be filtered through the whiting. The object is to produce a composition which will not form too thick a coating and still serves to protect the first coating and wood from atmospheric influences. Other varieties of japan or varnish can be employed to gain this end; but the preparation which I have described is the best which I have been able to discover at this time. If the surface thus obtained be too smooth for drawing upon by any desired process, it can be bitten or roughened by rubbing it with pumice-stone, sand, or emery-paper, &c. The coating should not be put on so as to form an objectionable crust.

I am aware that inventions or discoveries of a similar nature to this of mine have been made; but they have all been made with an idea of rendering the grain of the wood throughout of a denser texture, and to merely preserve the finished block after it was ready for printing and electrotyping from, and not for strengthening the surface when the greatest service is required, or bringing woods which have heretofore been considered semi-useless for fine work into use.

I claim by my invention—

1. The method of preparing blocks of wood for use in wood-engraving, consisting of first filling its exterior pores or surface with a preparation composed of white of egg, water, flake-white, and salicylic acid, combined as and in substantially the proportions set forth, and for the purpose specified.

2. The method of preparing blocks of wood for use in wood-engraving, consisting in first filling its surface with a compound of albumen, water, flake-white, and salicylic acid, and then covering the same with a moisture-proof coating or varnish, substantially as and for the purposes set forth.

3. A compound for treating the surface or exterior pores of wood designed for use in the making of wood-cuts, composed of white of egg, water, flake white, and salicylic acid, substantially in the portions stated, and for the purpose specified.

WILLIAM BRAH.

Witnesses:
LOYAL O. HENSEL,
GEORGE GALL.